June 22, 1965  E. A. AVAKIAN  3,191,006
INFORMATION STORAGE, RETRIEVAL, AND HANDLING APPARATUS
Filed April 3, 1962  8 Sheets-Sheet 1
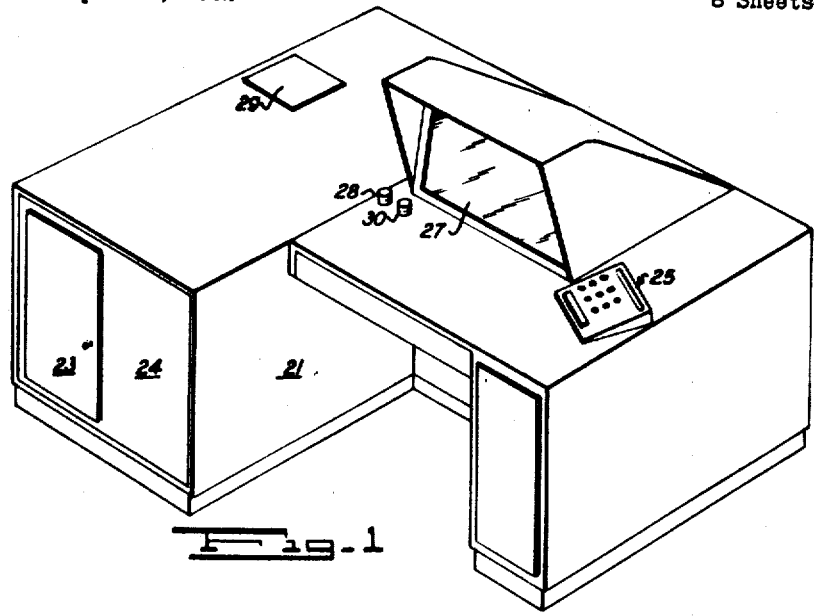
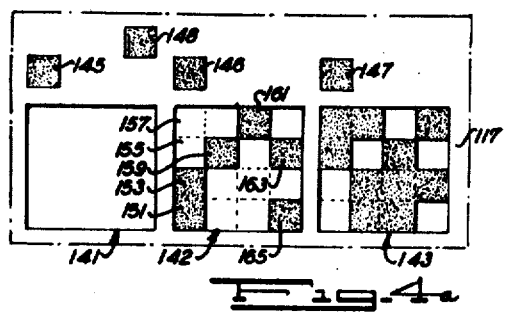
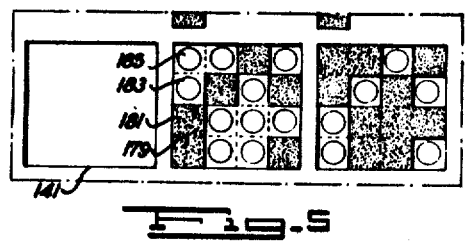
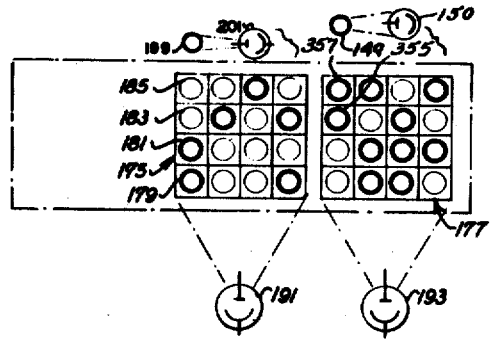
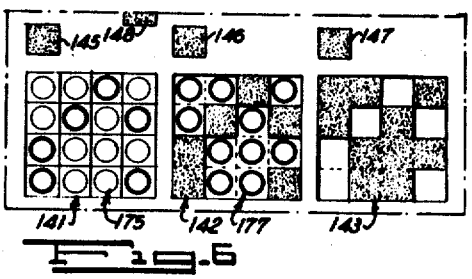
INVENTOR.
EMIK A. AVAKIAN
BY
Fisher Johnston & Goodw
ATTORNEYS June 22, 1965   E. A. AVAKIAN   3,191,006
INFORMATION STORAGE, RETRIEVAL, AND HANDLING APPARATUS
Filed April 3, 1962   8 Sheets-Sheet 2
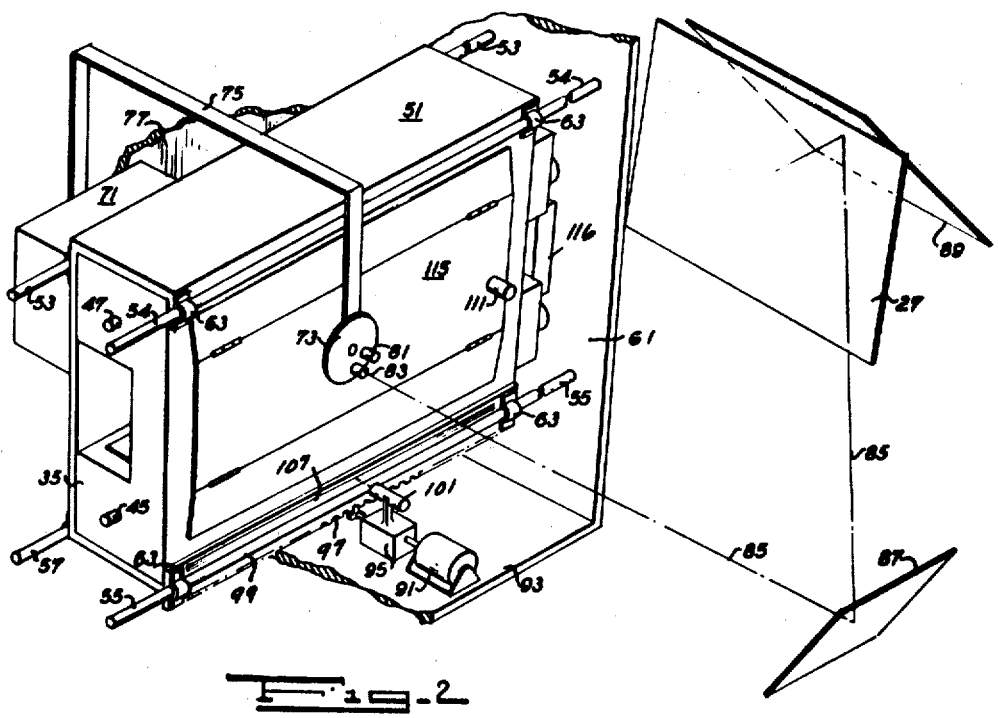
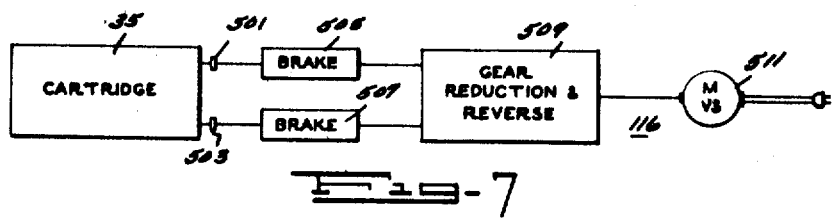
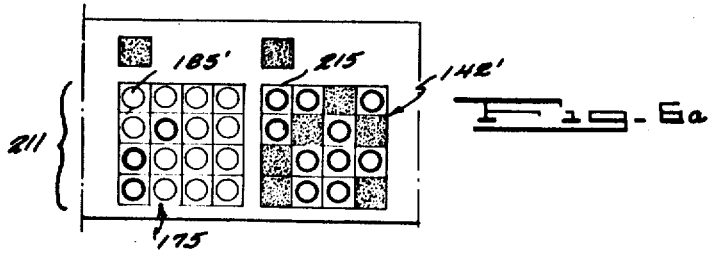
INVENTOR.
EMIK A. AVAKIAN
BY
ATTORNEYS

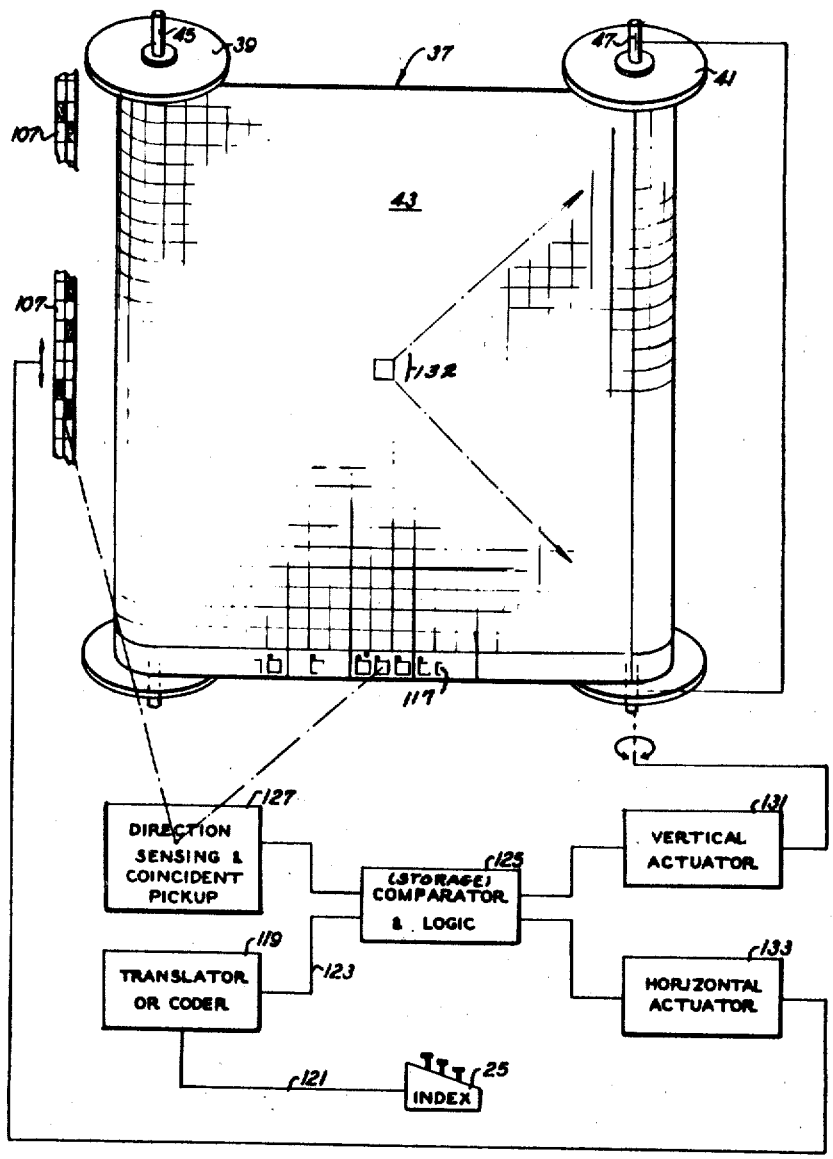

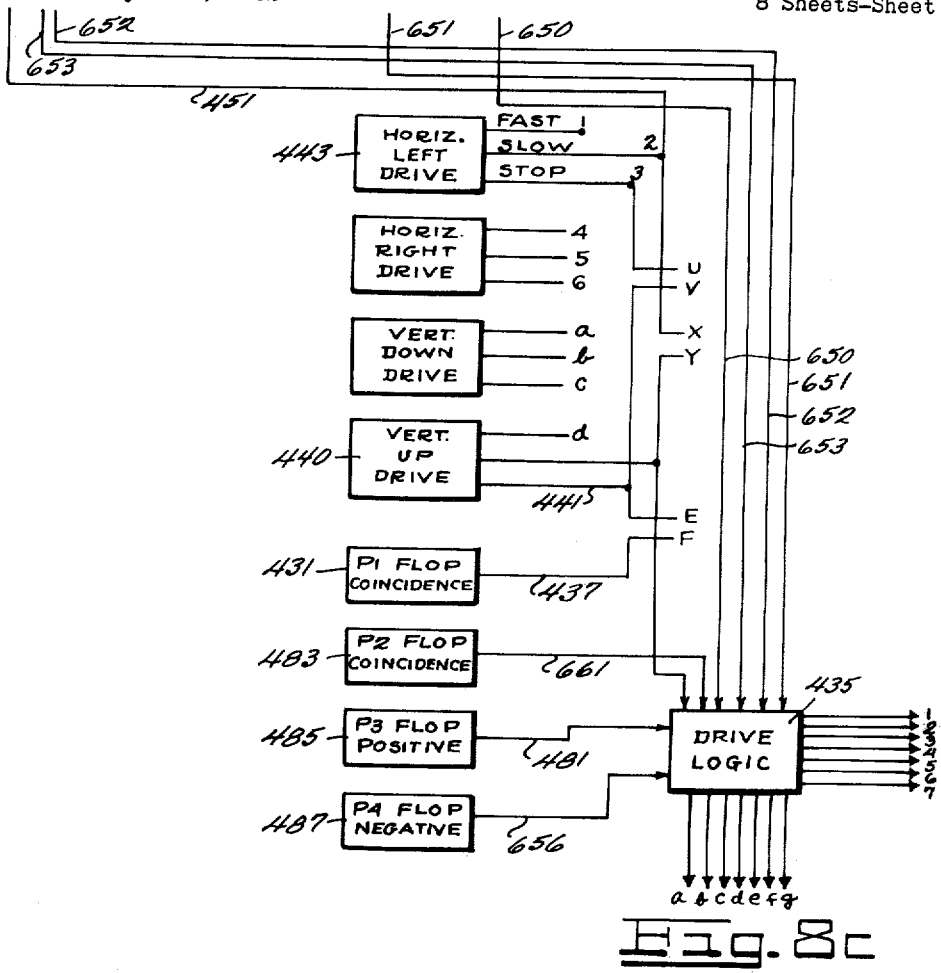
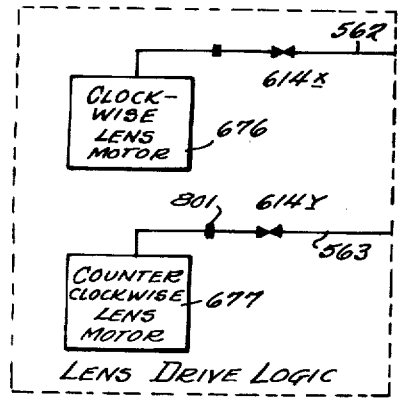

June 22, 1965  E. A. AVAKIAN  3,191,006
INFORMATION STORAGE, RETRIEVAL, AND HANDLING APPARATUS
Filed April 3, 1962  8 Sheets-Sheet 7
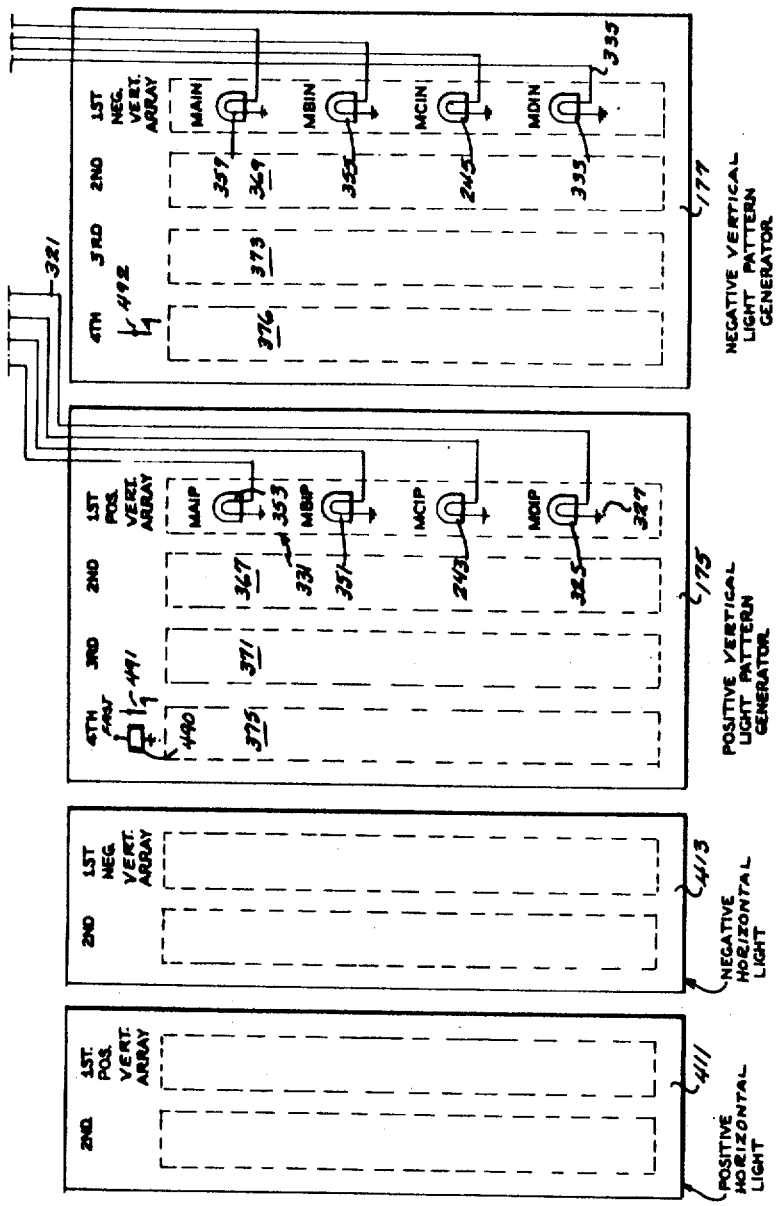
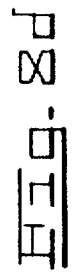
INVENTOR.
EMIK A. AVAKIAN
BY
ATTORNEYS

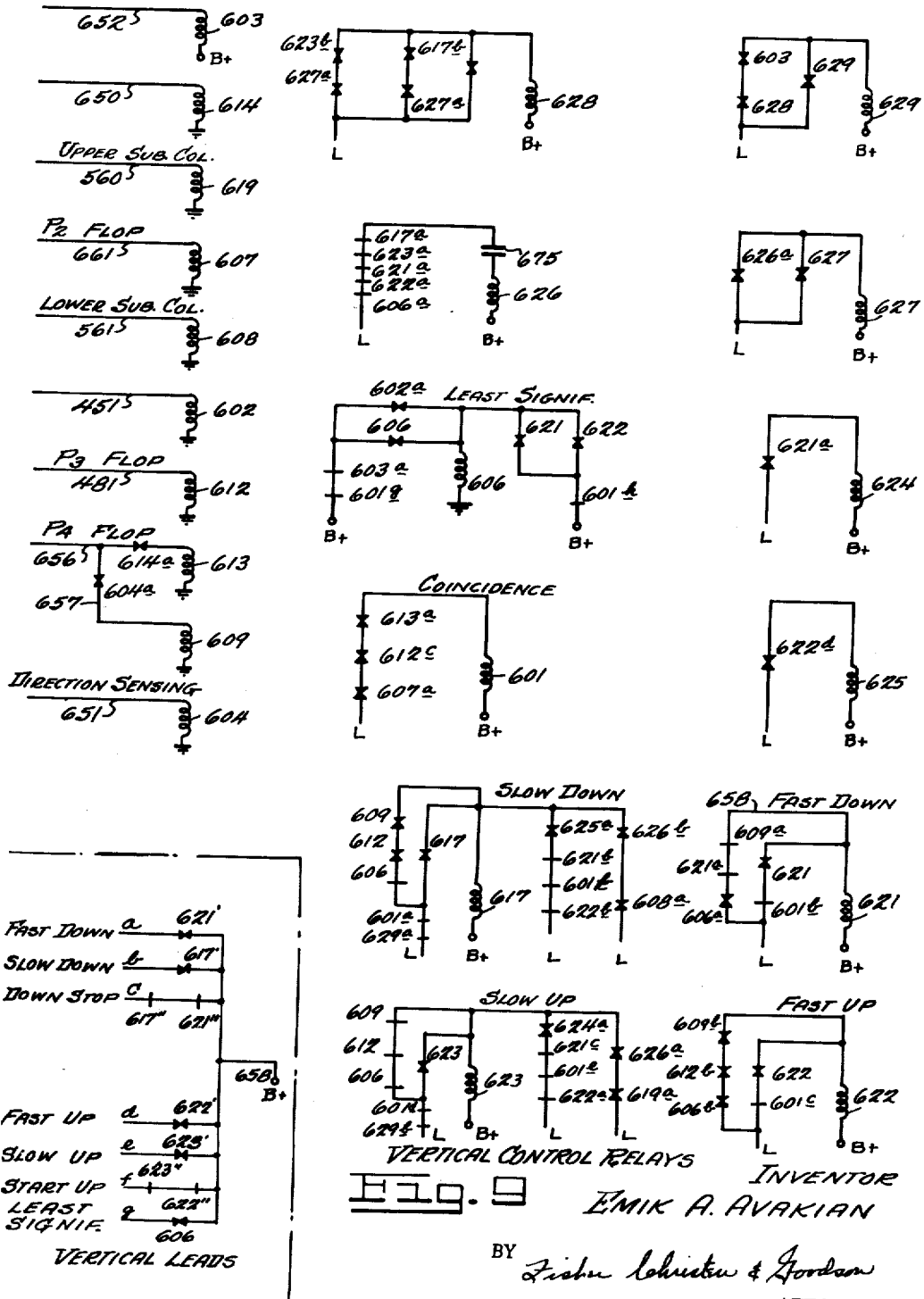

United States Patent Office 3,191,006
Patented June 22, 1965

3,191,006
INFORMATION STORAGE, RETRIEVAL, AND HANDLING APPARATUS
Emik A. Avakian, 92 Juana St., Tuckahoe 7, N.Y.
Filed Apr. 3, 1962, Ser. No. 184,821
11 Claims. (Cl. 235—61.7)

The present invention relates in general to the field of storage and rapid retrieval of information, and, in particular, provides apparatus capable of the high speed handling of information in many forms. This application is a continuation-in-part of my co-pending application, Serial Number 143,899, filed October 9, 1961.

In my U.S. Patent No. 2,610,791, issued September 16, 1952, for a "Stored Function Calculator," I describe a data storage and retrieval system wherein, by way of example, multi-digit numbers and symbols, such as, logarithms or trigonometric functions are stored and retrieved as needed.

The present invention is an improvement upon the apparatus of my above-mentioned patent and while capable of handling data of the multidigit type, it will be described in connection with an example involving the retrieval of images of printed or pictorial matter.

In current times, a library of information is becoming more essential to businesses, schools, researchers, the government, and others because the world's storehouse of knowledge is immense. The real problem is in the rapid and automatic handling, sorting and selecting from such a mass of information that which is pertinent to the subject at hand. I believe as a practical matter, this can only be done with automation techniques and then, preferably, those at least under the control of high speed devices, such as electrical or electronic apparatus.

As a first consideration, it is helpful if the information to be assimilated is stored in a condensed manner. The well known microfilming techniques, of course, permit such compacting of information; however, new and further problems arise in the rapid and automatic handling of such small microimage information units. Of course, all data information consist of one or more units of information. The problem of automatically handing at high speeds, individual diminutive information units, as well as handling varying sized groups of such units, are many. There is also the problem of how to automate the search technique and efficiently retrieve the desired unit of information, and further, how to store these units so that they may be subjected to automatic search techniques.

My invention resolves these particular problems by preferably employing a microimage scroll type storage medium which itself may be in a cartridge form and a number of such cartridges my constitute a library. The individual scrolls may contain, for example, 250,000 to 500,000 or more images of information with any information image being highly accessible. In one version, the scroll consists of a plurality of microimages discretely located. The microimages may be arranged in any order or be of any size, and the retrieval means adjusted accordingly.

In another version, the scroll consists of a single or several large microimages in which various subparts may be discretely located and retrieved according to the retrieval means. In yet another version, the scroll media may, in fact, be unwound and be a flat plane or curved area, and the retrieval means adjusted to discretely locate an area, with movement relative to either the retrieval means or to the storage medium. In the version to be described in particular, a typical scroll is 17 inches wide and 200 feet long. If information units, reduced to microimage form, are arranged in a vertical and horizontal array, over 250,000 microimages of 8½" x 11" pages reduced 28 times can be stored on such a scroll. Likewise, the scroll area could be doubled, such as, to 400' length, and in excess of 500,000 images stored.

A code track, along the length of the scroll, permits retrieval of the stored information by key board addressing (index number) which motivates an electrical or electronic logic mechanism to control movement of the scroll back and forth in one dimension or direction. Similarly, a code track extending at an angle, for example 90°, to the first code track but in association with a carriage housing the scroll may be employed for indexing to any given level on the scroll. Separate drive and sensing means are provided to permit, when desired, relative movement of the scroll with respect to an output device, such as a projector, in two directions simultaneously. The net effect of the movement is a slewing action which enables the image or information to be directly located in the retrieval mechanism without the necessity of first locating its general position either vertical or horizontal and then proceeding along the other coordinate to the final location.

Another version of my system permits the photographing of original documents with standard microfilm camera equipment with the microfilms being subsequently processed onto the scroll.

While the images are preferably stored photographically on the scroll, it is to be noted, of course, that the scroll may have pockets for individual microimages, groups or strips thereof, or adsesive means for receiving such images. Also, electrical or other storage could be employed so long as suitable retrievable means is matched to the system.

The output means will conform to the versions of the scroll such that copy, visual viewing or other means of image reading may be had. The output may include a large screen, such as 17" x 26", for visual display, film strip, an image reproduction either microimage or original size, an electronic image, or any other means of readout of the image. For example, the image can be projected for standard photocopy reproduction, for input to an electrostatic printing mechanism, or for exposure of various sensitive materials including heat and ultraviolet sensitive reproduction papers and films. The output can further be generated as an electronic or other modualted signal.

Actual preparation of the scroll may be done from original media or other microimage media. Image density, contrast, positioning film sign (positive or negative) and format are controlled during preparation of the scroll. A practical means of accomplishing this end is to prepare a master strip film of images which are then transferred to the scroll. The scroll itself may be positive or negative or mixed depending upon the desired output. Duplicate scrolls may be made using the basic preparation equipment or special devices. If the scroll is made of certain materials, such as, Kalvar ultraviolet sensitive film which is dry developed by heat, it is practical to expose and develop part of a scroll, and later add and develop additional images.

Indexing of the image information content is done separately from the viewing or scroll handling unit. Thus, a cross reference to any existing information unit indexing system permits ready adaptation of the image indexing system which I may employ.

My system is modular to permit flexibility with respect to input or output or tie-in with computors and other data handling or process systems. For example selection could be under control of interface equipment for punched card or punched tape input or other type or remote control; high speed facsimile transmission or video output may be added.

It will readily be appreciated that my unit could simply be placed in a computer system wherein it would constitute one or more memory units for providing or outputing images or information in response to queries generated at remote points or for searching under external control.

In one embodiment of my invention, I employ a novel code apparatus and locating technique which may utilize the binary system in a binary bit configuration combined with the conjugate thereof. The scroll is coded relative to its two storage dimensions, with each frame having a positive and negative code grouping in binary bit fashions. Adjacent columns and rows of the scroll are consecutively numbered. A frame may define a discrete storage element or a grouping of such storage elements. By way of example a frame may be defined by a column and a row. Either may have sub-divisions. Each frame includes in addition to the positive and negative code group an uncoded area (transparent window) which will be used for purposes of direction sensing.

In association with each code track there is provided a positive and negative bit configuration generator. While in my illustrated example I develop light patterns indicative of the new address to be reached by these generators it will be apparent to those skilled in the art that magnetic or other form of pattern generation could be substituted, without departing from the spirit or scope of my invention.

Within the digit capacity of the code employed, there will be only one scroll code pattern which will correspond to the new address coded into the lamp arrays generated by the positive array and its conjugate. The conjugate is provided to eliminate ambiguities.

When a frame comprises more than one information element storage (sub-columns), indexing may be employed to the elements within that frame by counting in either direction from a reference bit position for such frame. In either event each frame or each sub-division thereof has a single bit and such bit is the reference bit for the information stored in that row or subdivision.

The reference bit for each coding group or frame is used with the detection means for the positive and negative groups to establish an AND condition signifying coincidence of the scroll position to the new address. This AND condition is one of blackness for the positive code to lamp array comparison, the conjugate code to lamp array comparison and the reference bit detector. From this point fine adjustment or movement can be made within each group or frame. Of course the subdivision or sub-row individual bits may be detected by the same pick-up means associated with the bit indicative of a frame or group or they may be detected by a separate pick-up and in which case the sub-column or row location bits would be translated to the group reference bit.

A further feature of my invention resides in a novel direction sensing apparatus and technique in which each code track (horizontal and vertical for example) includes a direction sensing sync bit indicia for each frame and a separate reading photocell for detecting the presence of each such bit.

When the input indexing device is cleared, the scroll is caused to move in a pre-determined manner until the nearest first direction sensing bit (to its detector means) is detected. At such time the scroll is in a staggered position relative to the lamp arrays such that its transparent window area is over the positive lamp array and its positive scroll code is over the negative lamp array. The negative scroll code is not used for direction sensing.

Next the lamps in the positive and negative arrays are automatically turned on in sequence. Correspondingly located lamps in each array are simultaneously sampled. All lamps in the negative array are lighted but only those in the positive arrays which identify the new address are lighted.

The detector or photocell over the positive lamp array will see a light condition, bit by bit, in accordance with the new address and a black condition otherwise. The photocell over the negative lamp array will see blackness in accordance with the presence of the scroll code which indicates the present position of the scroll. A bit by bit comparison, first with respect to the most significant bit (digit position) in the new address relative to the present address will develop which multi-digit number (address versus present scroll index) is the largest. If the new address is the largest number the logic automatically causes the scroll to move in one direction and if the opposite condition obtains the scroll is of course moved in the other direction. This operation may be carried out simultaneously in a two dimensional storage area such that, for example, the scroll may be moved up and to the left simultaneously, effectuating a direct slewing movement to the information sought if such is the direction commanded by the direction sensing logic.

Generally speaking it may of course be appreciated that the sub-columns sub-rows or even columns need not be uniformly spaced nor their contents limited to equal dimensions but only the code representing any such group or sub-group must conform to the dimensions of the generator for detection purposes. For example, a wall display array which may assume the form of a world chart, a battle area, or any other configuration could be indexed and index runners could follow the code tracks for automatically locating any given sector or unit. It will be appreciated that the display runners, or both could move relative to the other. So long as the pick up or detector means are in alignment with their respective tracks, either may move relative to the other or relative to the output means or the storage means may be moved relative to the output means as directed by the input address without any departure from the scope of my invention.

In my illustrated embodiment, movement of the storage medium toward the new address may be expedited by using various speeds of the actuating means employed. One technique which I developed provides apparatus capable of ignoring the least significant order or orders of the new address until its general area is reached. An intentional overthrow of a magnitude at least equal to the order(s) ignored is contemplated so that the logic may be programmed automatically to reverse and lessen the drive speed to permit stopping on the exact location sought. Obviously, any number of overthrows and reversals could be programmed into my system.

With the foregoing in mind, it is an object of my invention to provide a data handling device capable of the rapid and automatic handling, storage and retrieval of information in any form.

A further object of my invention is the provision of a high speed image retrieval system in which the information to be located may be directly selected without the necessity of pursuing paths along right angle coordinates sequentially.

A still further object of my invention is the provision of relatively inexpensive compact data handling and retrieval apparatus.

Another feature of my invention is the provision of storage apparatus indexable independently of the data to be stored.

A still further feature of my invention is the provision of an extensive data storage system in which data or information may be outputed and further data may be located from any spot or location without the necessity of returning to a zero or reference postion.

Also, it is an object of my invention to provide a data storage and handling system which is compatible with present day computer and data processing systems. A still further object is the provision of the apparatus for establishing relative movement among several components to effectuate the rapid and automatic location of any inputed address.

Other and further objects of my invention include the provision of unique coding and sensing arrangements; novel logic provisions for operation therewith and for expediting such operations; and suitable direction determining means for minimizing the traversal from any given location to any selected information address; and Still further objects of my invention will become apparent to those skilled in the art from a reading of the detailed description to follow in the light of the accompanying drawing in which:

FIG. 1 is a perspective view of a suitable console or housing for apparatus in accordance with my present invention;

FIG. 2 is a partly structural, partly schematic illustration of suitable apparatus for establishing a retrieval movement preferably employed directly to locate a given address from any location, along with projection outputting means;

FIG. 3 is a detailed showing of one type scroll along with a block diagram of certain functional components useful in association therewith;

FIG. 4a is a detailed showing of a suitable code for use in connection with the scroll of FIG. 3 and depicts a positive and negative code group;

FIG. 4b is a partly schematic plan view of the positive and negative lamp arrays for the vertical actuating means with a multi-digit address depicted by lighted lamps; also the photocell pick-up for each array, as well as the coincident bit and sync bit lamps are shown;

FIG. 5 is a plan view of a super-position of the scroll code of FIG. 4a over the lamp array of FIG. 4b;

FIG. 6 is a view similar to FIG. 5 but with the scroll staggered or moved to the right so that the positive lamp array is visible through the transparent block of the scroll;

FIG. 6a is a schematic plan view depicting a comparison of a code indicative of a new address to be reached and the present address or starting point;

FIG. 7 is a schematic block type representation of a typical motor drive for the scroll of FIG. 3;

FIGS. 8a–8d is a wiring diagram suitable for use with my present system;

FIG. 9 is a relay logic control circuit for substitution into FIG. 8a; and

FIG. 10 is a lens drive and logic diagram.

Figure 8A:
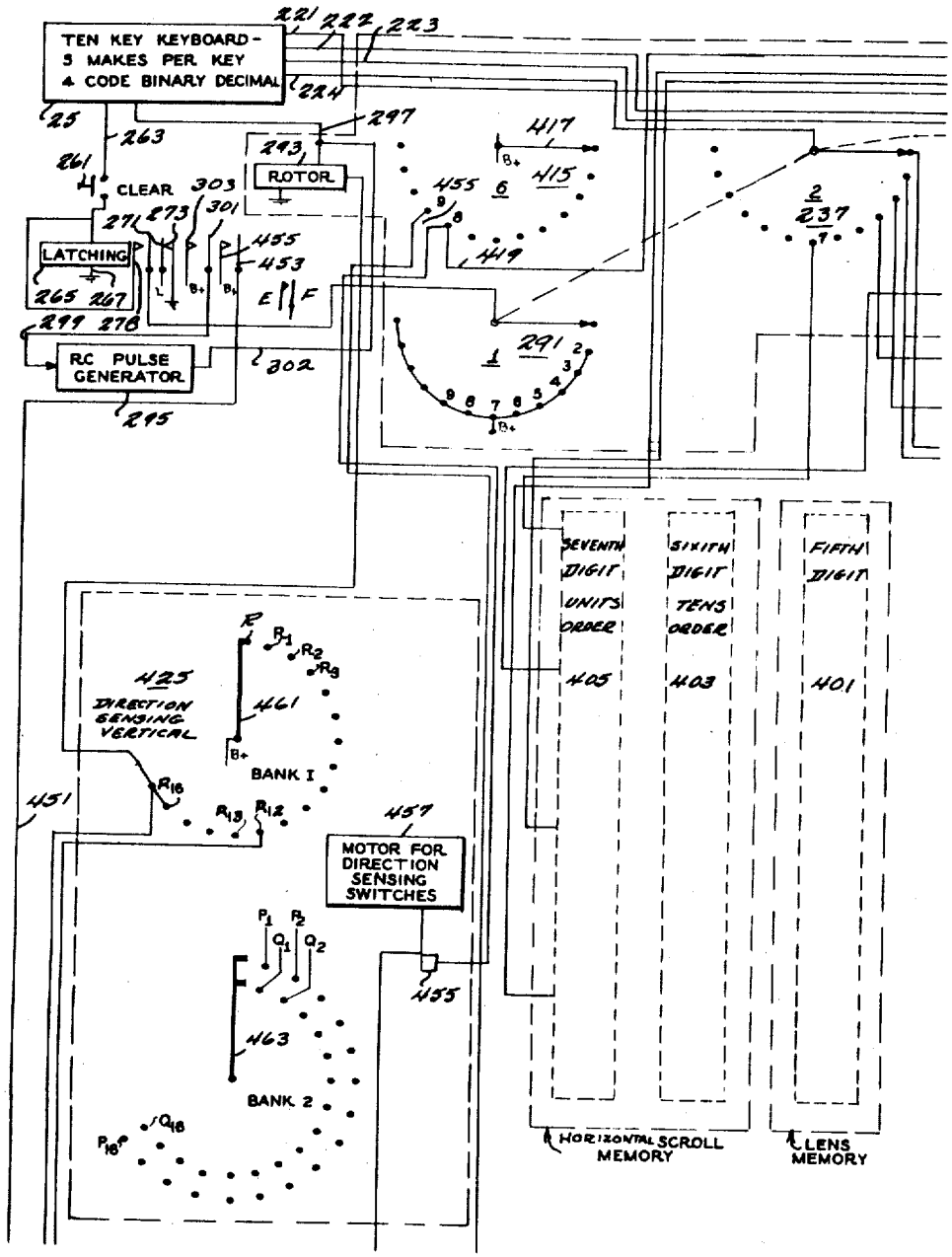

Referring now to the drawings and particularly to the perspective of FIG. 1, there is shown a console generally indicated at 21, suitable for housing the system or apparatus of my invention which is contained behind the panel 24 having an access in the form of the door 23. An input indexing means is shown in the form of the keyboard 25 adapted to receive a multi-digit number or a single digit number, indicative of the address of a piece of information to be located and utilized or retrieved. A viewing screen 27 is provided for the operator to view a projection of the image or information located. Repairs and servicing of the projection structure and the distal end of the interchangeable, functional units of my invention are facilitated through the trap door 29.

The major interchangeable functional unit adapted to be inserted through the front panel door 23 comprises the cartridge 35 of FIG. 2, which itself contains the scroll generally indicated at 37 in FIG. 3. The rollers 39 and 41 (FIG. 3) for the scroll storage area or medium 43 have respective axes 45 and 47 which are visible in both FIGS. 2 and 3.

The cartridge 35 (FIG. 2) is generally U shaped in cross section or end elevation and is adapted to slide into carriage 57, which is movable along the four horizontal, fixed rods 53, 54, 55 and 56. These rods are fixed within the console 21 (FIG. 1) to a partition or rear wall 61 at the far end (FIG. 2) and to the interior of the front panel 24 at their proximal ends (FIG. 2). The carriage 51 is provided with a plurality of indentical collar or semi-circular shaped bearings 63 for slidably mounting it for movement along the rods 53 through 57.

The illustrated output device is shown in FIG. 2 as a projector 71 having fixed thereto a turret lens 73 by way of a standard or mounting bar 75. The projector 71 is rigidly fixed to the rear wall 77 (FIG. 2) of the console 21 of FIG. 1, such that the carriage 51 and cartridge 35 move relative thereto. The turret 73 includes a fine focus lens 81 and a rough or wide focus lens 83, the only difference being in the area of display. In either event, the optical output path to the viewing screen 27 is shown by the dashed lines 85 by way of two mirrors 87 and 89.

The selective magnification for two sizes of presentation by the turret lens is automatically programmed into the system for the purpose of displaying, for example, individual pages of data or groups of pages.

It should also be mentioned that the projector light beam is adequately filtered to eliminate the possibility of damage to the microfilm or scroll by excessive heat. Suitable focus and brightness controls 28 and 30 are provided on the console 21 of FIG. 1 for permitting proper adjustment of the image presented on the viewing screen 27.

The driving mechanism for the carriage 51 and cartridge 35 is shown as the small motor 91 (FIG. 2) fixed to the lower wall 93 of the console 21 (FIG. 1). The drive is by way of a reduction and reversing gear train or box 95 which engages the teeth or slots 97 of a depending flange 99, forming a part of the carriage 51. Obviously, any conventional driving means, preferably susceptible to varying speed control and having provisions for bi-directional driving, could be employed, such as friction drives, rack and pinion mechanisms, or even reversible stepping switches.

A photocell housing 101 is fixed to the gear box 95 and "reads" the code track 107 printed along the depending flange 99. The motor 91 and photocell unit 101 under control of the logic circuits to be described, cooperate in moving the carriage 51 and associated cartridge 35 to any position or address set into the horizontal control portion of the keyboard 25 (FIG. 1).

Naturally, the photocell housing 101 makes as light-tight a connection with the flange 99 as is practically possible, so that ambinet light will not influence the operation. The usual methods for doing this are suitable and it will suffice here to state that a felt or other pliable skirt surrounds the housing 101 and presses against the flange 99. Also the electrical readout circuit may include the usual cathode biasing resistor (not shown) for making adjustment for any ambient light which reaches the individual cells.

In a similar manner, the photocell housing 111 (FIG. 2), fixed to the front face or access panel 115 of the carriage 51, reads the vertical code track 117 (FIG. 3) to cooperate with other similar structure (scroll drive motor and gearing 116—FIGS. 2 and 7—to be described) in directing and driving the scroll to wind or unwind to a particular new address or location.

Looking now at FIG. 3, a functional description may be had with respect to the relationship of the scroll and its horizontal and vertical coding to the electro-mechanical controls, generally shown in block form. The index input 25 is adapted to receive the address of the new position to which the scroll is to be moved. Of course, this address may include a position along code track 117 and a position along code track 107, thereby defining a single frame or sub-frame of information to be located.

The index means 25 also receives a digit indicative of the particular sub-column to be reached and a particular lens to be employed in outputting either a sub-frame or an entire frame.

The index means 25 may comprise a ten-key keyboard, which, in combination with the translator or coder 119 via multiple lead 121, will have five makes per key for a 4-coded bit binary to decimal maximum use. Hence, the line 123 includes at least four electrical leads, one for each binary bit positon, for handling the bits separately.

Any digit punched into the ten-key keyboard will appear on leads 123 in binary coded form as one or more bits with the exception of the digit 0 which has no bits.

The comparator and logic network 125 receives the digits indicative of the new address in bit form and stores them in memory relays (or other suitable storage devices), as will be described in detail hereafter. The direction sensing and coincident pickup devices grouped in the box 127, sense the present scroll position for comparison with the address stored in usable form in the comparator 125.

The logic portion of the comparator 125 then makes a decision in which direction(s) the scroll should be moved relative to the output means (functionally pictured at 132 but see lenses 81 and 83 of FIG. 2), and accordingly starts the vertical 131 and horizontal 133 actuators in their proper direction to wind or unwind, and shift or move the scroll toward the new address. The horizontal logical portion of the comparator and logic network 125 then recognizes coincidence between the address in the comparator section and the code passing the horizontal direction sensing device. The same is true for the vertical section which operates entirely independently of the horizontal portion. The actuators 131 and 133 are caused to reverse their respective directions under control of their associated logic section of 125 but not until some overthrow has taken place.

The logic circuit then permits reversal at a slower speed until coincidence is sensed and all movement is stopped.

The foregoing is even more apparent from a consideration of FIGS. 4a, 4b, 5 and 6, wherein the vertical scroll code track 117 is detailed generally with respect to portions of the direction sensing and coincident pickup means 127 of FIG. 3.

In FIG. 4a, the vertical code track 117 is shown as including a three-windowed lower portion including a transparent scroll window 141, without any coding, a positive coded scroll portion or window 142, and a negative coded scroll portion or window 143, as well as a multi-bit upper portion including bits 145, 146, 147 and 148. The scroll portion 142 is coded in the normal or positive binary fashion to depict the multi-digit number 3485, and the right-hand window or scroll portion 143 is the negative or photographic mirror image of the positive code 142. Reading from left to right in the positive window 142, it is seen that a bit position is marked in the window 142, in the lower left-hand corner 151, and directly above it, at position 153. These bits are in the highest significant digit place corresponding to a magnitude of 3 in the thousands order of the illustrated example. From bottom to top, they signify a bit in the zero and first order binary powers. The second and third order binary bit positions 155 and 157 are void or transparent.

In the same manner, it may be seen that the next most significant digit position includes a bit 159 in the location to represent the decimal digit 4 in the hundreds order. Similarly, bit position 161 signifies eight tens units, and the bits 163 and 165 combine to provide the units digit 5.

In FIG. 4b, a positive lamp array including 16 individual lamps is indicated at 175, and a similar negative lamp array at 177. It should be apparent that the sixteen lamps of these arrays respectively correspond to the bit positons of windows (or code configuration positions) 142 and 143 of FIG. 4a. The positive and negative lamp arrays 175 and 177 are adapted to be lighted in accordance with a binary representation of the address to which the scroll 37 of FIG. 3 is to be moved in the vertical direction. Their physical location is underneath code track 117.

By way of illustration, the lamp banks 175 and 177 include the same binary representation of the same digital number as coded in FIG. 4a in order that a coincident condition may be depicted. In other words, lamps 179 and 181 will be lit corresponding to the void or transparent bit spaces 155 and 157 of FIG. 4a. This pattern is, of course, repeated in the negative lamp array 177 relative to its associated negative code 143 of FIG. 4a.

A positive array photocell pickup tube 191 is shown in FIG. 4b, responsive to any light emanating from the lamp array 175, and similarly, a negative photocell tube 193 observes light from the negative lamp array 177. These two photocells are included in the photocell housing 111 of FIG. 2 and are physically positioned above or outwardly of the scroll medium 43. However, the positive and negative lamp arrays 175 and 177 of FIG. 4a are deployed behind or beneath the scroll medium 43, such that light from the lamp arrays must pass through the scroll vertical track 117 (FIGS. 3 and 4a) to energize photocells 191 and/or 193. It will be recalled that light-tight housings are employed here along with ambient light adjustment, such that when no light is passed through the scroll track 117, the photocells 191 and 193 observe a dark or black condition which signifies coincidence.

FIG. 5 illustrates the coincident overlay of the code track of FIG. 4a relative to the lamp array of FIG. 4b. It may be noted that lighted lamps 179 and 181, located in the most significant digit place of positive lamp array 179 (FIG. 4b) are covered or obscured by the bits 151 and 153 of FIG. 4a, whereas also in this most significant digit place, the unlit lamps 183 and 185 are uncovered by the bit voids 155 and 157 of FIG. 4a. FIGS. 4a and 4b may be compared in the super-imposed position of FIG. 5, bit by bit, to reveal the fact that the blackness condition exists, signifying coincidence, and the only coincidence for the vertical scroll track, because of the fact that the total number of columns on a scroll is representable by a different configuration within any capacity used. It should be noted that both the positive and negative code groups 142 and 143 (FIG. 4a) are utilized along with both of the positive and negative lamp arrays 175 and 177 (FIG. 4b) to avoid any possibility of ambiguities. The transparent window 141 is not employed for coincidence seeking.

Next, the problem of reading exact coincidence will be discussed in relation to the center coincident bit 146 (FIG. 4a) and its associated lamp 199 and photocell 201 (FIG. 4b). It will be recalled that the windows or code groups 141, 142 and 143 occupy a position of one column width on the scroll and each column in the illustrated example has three sub-columns. In other words the window 141 is centered approximately below the left-hand sub-column, the window 142 is centered below the middle sub-column and the window 143 is located beneath the right-hand sub-column (FIG. 3).

The coincident bit 146 (FIG. 4a) is provided to effectuate the exact coincidence as shown in FIG. 5. This bit is adapted to cover lamp 199 (FIG. 4b) such that photocell 201 will experience the blackness condition each time its lamp is covered by a bit 146, at least. Consequently, when photocells 191 and 193 receive no light at the same time photocell 201 receives no light (a logical AND condition) the exact coincidence of FIG. 5 is had and the lens turret 73 (FIG. 2) is centered over a frame of the column address. Depending upon the lens selection (either wide angle lens 83 or long lens 81) either an entire frame of this column may be projected to the viewing screen 27 or a single sub-frame of the center sub-column may occupy the screen.

When a sub-frame from the sub-column to the left or the right of the center sub-column is to be viewed, I have found there are several ways to achieve this but I believe the simplest is to use auxiliary or off center coincident bits, such as, 145 and 147 of FIG. 4a. Thus, center coincidence is always reached first and the scroll arrested, and then the scroll is slid one sub-column to the left or right (depending on its address) such that the same center coincident bit photocell 201 (FIG. 4b) locks-in on the first bit or black condition it sees following coincidence. The logical relation here is one of coincidence on the code and center coincident bit 146, followed by off coincidence but arresting movement on the next black condition of photocell 201. This is, of course, done at the slow speed so that overthrow is avoided.

The shift from center sub-column position to the left or right sub-column position does not require any direction sensing apparatus or logic because the input address includes a fifth order digit which addresses to the proper column and sub-column. This fifth order digit may be coded as follows:

1=Sub-column on left, long lens
2=Center sub-column, long lens
3=Sub-column on right, long lens
4=Center sub-column and wide angle lens In this manner any given sub-frame may be exhibited on viewing screen 27 by selecting digit 1, 2 or 3 in the fifth digit order, or any complete frame of any column may be projected to the viewing screen by depressing digit 4 in this order.

Sub-column location can also be achieved by the use of a further track of only sub-column locating bits with a separate sub-column bit pick-up device, while in one respect this simplifies the logic, it nevertheless increases the scroll dimension allotted to coding.

Direction sensing

Direction sensing will now be discussed in order that it may be made apparent how the drive mechanism is commanded to drive the scroll in a wind or unwind direction and similarly with respect to the other axis how the carriage motor 91 (FIG. 2) is commanded to drive the carriage to the right or to the left. (Note: While the axes are called horizontal and vertical it should be obvious that the device may be oriented in any fashion and the axes could assume different angles—such as—one to be "set on the bias" relative to the other.)

The direction sensing feature arises from the fact that my invention does not require a return to zero after each retrieval but rather permits the apparatus to stay at the last commanded address until a new command is entered at which point a decision is made as to which direction the scroll must be rolled and the carriage moved, relative to the output means. The manner of comparing the present address with the new address to decide which represents the highest number to provide a direction indication will now be described in connection with the vertical actuating means 131 (FIG. 3) because this poses the most complex situation and the horizontal drive control is simply effected in the same manner.

The determining of direction in which the scroll will be moved takes place while the positive code 142 (FIG. 4a—depicting the present position of the scroll) is over the negative light array 177 (FIG. 4b) and the transparent area or window 141 of the scroll is over the positive light array 175. This staggered or non-coincident superposition is shown in FIG. 6. The negative scroll code 143 although visible in this figure is not used for direction determining.

The above positioning is determined by the direction sensing sync bit 148 when it coincides with or blanks the photo cell 150 (FIGS. 4a and b).

The new address is in the memory cells or relays (to be described) which, of course, control the pattern of light in the positive array 175. The scroll and code track 117 is caused to slip the equivalent of one sub-column to the right (FIG. 6) relative to the lamp banks 175 and 177 and to "lock-up" long enough for a direction decision. This shift movement can be simply wired into the direction determining logic and might always be a shift of the scroll to the right by one sub-column except for the last sub-column of the scroll which could be programmed always to proceed to the left for the direction sensing operation. The circuit details will be considered in connection with the description of FIG. 8.

An example of a typical direction sensing determination is now considered with reference being had to FIG. 6a. Assume that the scroll is positioned on column 3485 (center sub-column thereof) and that the new address of the information to be retrieved is 3400 to the nearest column. Obviously, the scroll must be moved to the right (as viewed in FIG. 3 which is the same as up in FIG. 2) to the new address. This is accomplished in the following manner.

All lamps in the negative array 175 are turned off. Relay DS1 shown at 201 (FIG. 8) will permit level 2 (237) of the stepping switch 203 sequentially to light all of the negative lamps, irrespective of the memory relays (such as MA1–MD1 FIG. 8b). Relay DS2 shown at 205 will interpose the second level of the direction sensing switch 425 (FIG. 8a) into the circuits for the lamp arrays 175 and 177. It should be noted that the signal to be developed from turning the negative lamps 177 sequentially on, as modulated by the positive scroll code 142 (FIG. 6a) could be compared against the on or off conditions of the memory relays which hold the new address or the sequentially developed signals from each lamp array can be compared.

The comparisons in bit-by-bit fashion of these two patterns, namely, the pattern of the new address 211 (3400 in bit fashion on lamp array 175, FIG. 6a) with the pattern developed by sequentially turning on the lamps of the negative array 177 as developed through the positive scroll code 142' (3485 in bit fashion on lamp array 177, FIG. 6a) is accomplished by starting at the left-hand upper corner of array 177 and comparing this bit condition 215 (FIG. 6a) with the corresponding bit or lamp condition 185' (from the associated memory or cell condition) of the new address pattern. The next lower bits or conditions are then compared until the highest digit position of the patterns has been examined.

The same process is followed with respect to the next most significant digit (the digit "4" in the example of FIG. 6a) and so on until examination is provided for the least significant digit or until a lack of digit identify is observed.

Thus, a feature of the invention resides in the fact that the first time coincidence is not found in examining the digits of the patterns from most significant to least significant, movement in the proper direction is automatically started.

In the specific example of FIG. 6a, assume that the letter X is the signal indicative of blackness and the letter O is a light condition (on photocells 191 and/or 193 of FIG. 4b) then the logic equations for comparison are as follows:

$X-O$=no action
$O-X$=no action
$X-X$=move right as viewed in FIG. 3 (up FIG. 2)
$O-O$=move left as viewed in FIG. 3 (down FIG. 2)

In FIG. 6a, a comparison of the most significant digit positions of the photo negative of the positive scroll code 142', developed in sequential fashion over the negative lamp array 177, with the new address pattern 211, provides the following conditions:

$X-O$
$X-O$
$O-X$
$O-X$

The foregoing conditions correspond to the no action conditions because the highest or most significant digits are equal (3=3) and as yet it cannot be determined in which direction movement should take place.

Similar comparisons of the next most significant digits (4=4) provides the following:

$$X-O$$
$$O-X$$
$$X-O$$
$$X-O$$

Again no action takes place.

A comparison of the next most significant or tens place, in this example, provides the condition $X-X$ immediately, because 8 does not equal O and, immediately movement takes place with the scroll winding to the right (FIG. 3) or up (FIG. 2). The scroll moves at high speed in the proper direction until coincidence is sensed. The scroll is braked but otherthrows by ten or more digits of memory indexing and the direction is automatically reversed by the logic and movement established at slow speed. When coincidence occurs a second time, the scroll is braked at the exact coincidence point. Adjustment to the proper sub-column is then made, if other than the center sub-column (or a frame rather than a sub-frame) is programmed.

General circuitry

Figure 8B:
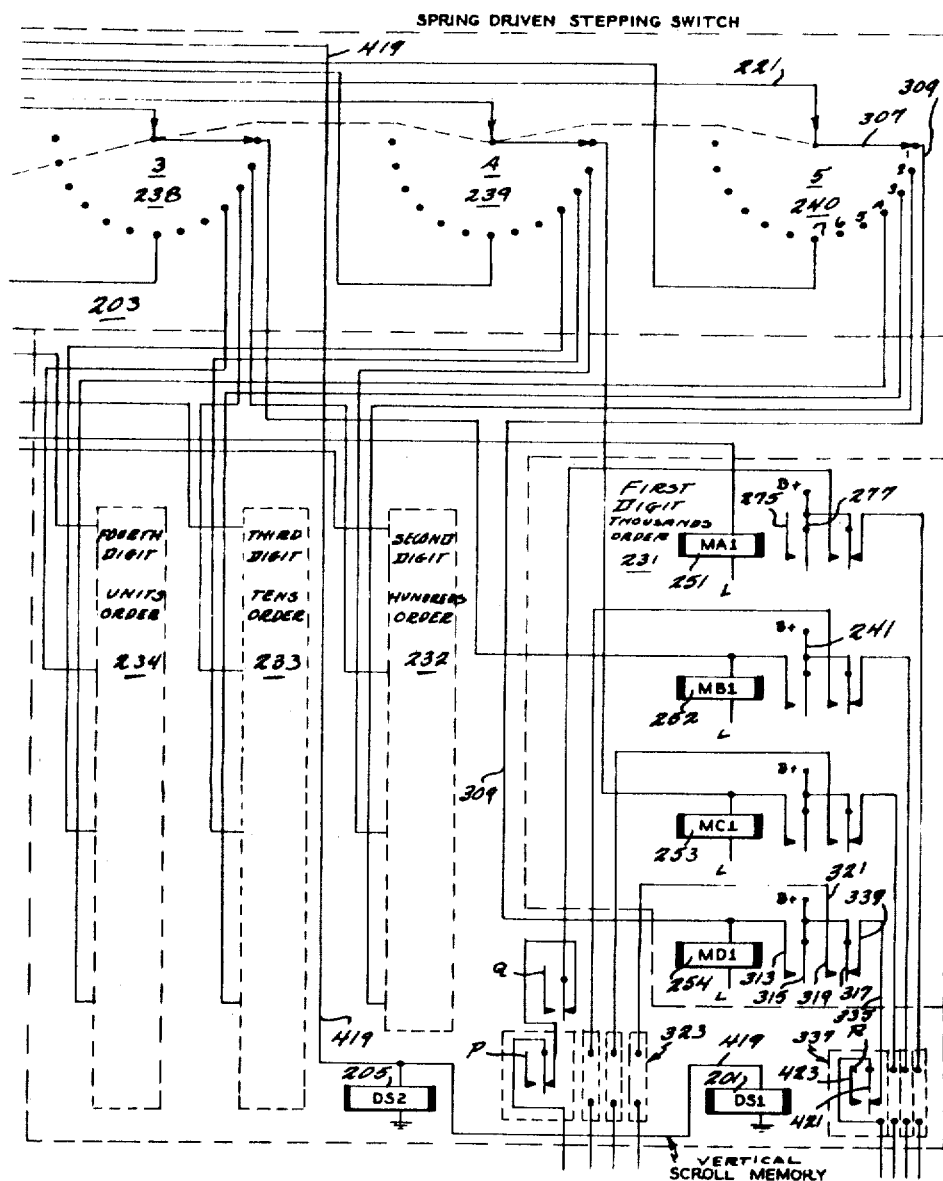

All of the foregoing will further be explained as it relates to the showing of a suitable electrical or control system in the form of the wiring diagram shown in the four sheets comprising FIG. 8 but labelled FIGS. 8a, 8b, 8c and 8d. While not fully electronic, the circuit exhibited is nevertheless a practical showing of apparatus of an inexpensive nature susceptible to a relatively fast operation and capable of carrying out the logic heretofore related. Of course it will be apparent to those skilled in the art that full electronic devices can be substituted, in equivalent form, and following the principles taught herein will perform the functions heretofore set forth and now to be described in greater detail.

With the four sheets of FIG. 8 assembled in order 8a, 8b (left to right) over 8c, 8d, the ten key keyboard or input device 25 will be seen in the upper left-hand corner of FIG. 8a. This is an ordinary or well known device in which each key includes 5 makes or contacts per key and is adapted, in combination with the other apparatus to be described, to develop a coded decimal binary output in the form of the presence or absence of B+ voltage. Four of the contacts are for the binary code and the fifth make energizes the stepping switch rotor 293, the key in returning lets the rotor go. The wipers are moved (spring driven) upon release of the rotor magnet rather than upon energization of the magnet.

The four output lines 221 through 224 convey the binary coded address, digit by digit, to the memory or storage means 231, 232, 233 and 234 (FIGS. 8a and 8b) by way of the second through the fifth stepping switch levels 237, 238, 239 and 240 of the stepping switch 203. The memory or storage section 231 is adapted to receive and store any thousands order digit in binary form. This thousands order memory includes four storage relays 251, 252, 253 and 254 capable of holding any digit representation in the binary code form from 0 through 9.

This order is illustrated in detail whereas the hundreds order 232, tens order 233 and units order 234, for the vertical multi-digit command are shown in block form because their circuitry is identical to section 231 and only the inputs thereto are illustrated for the reason that they are connected to different contacts of the stepping switch levels 2 through 5.

The general utilization and storage of the representations of the decimal digits, set into the keyboard 25 (FIG. 8a), will now be described beginning with the clearing of the keyboard by the depression of the clear or reset button 261 preparatory to the insertion of a new address. This button is in series with keyboard B+ lead 263 which extends to latching relay 265 and thence to ground over a connection 267. The reset button 261 is normally open and the reset operation energizes latching relay 265 and permits its contacts 271 and 273 to open thereby removing ground from contact 271 which is connected from point L (FIG. 8a) for example, to the lower side of memory relay 251 (FIG. 8b.) The removal of ground from memory cell or relay 251 de-energizes this relay (if it is in the energized position) to open its latching or holding contacts 275 and 277.

Observation of each of the memory relays or relays 252, 253, 254 of the thousands order 231 indicates that each is grounded through the contacts 271, 273 of FIG. 8a and consequently each such relay will also be de-energized or restored to its normal (OFF) condition because of the closing of the circuit to the main latching relay 265 (FIG. 8a). As a matter of fact, all of the memory cells or relays of all of the orders are de-energized in the same manner, over the common grounding contacts 271 and 273, such that the apparatus is ready to receive a new address or command from the keyboard 25.

Also the stepping switch 203 cycles to its home position indicated as position No. 1 on each level, with such homing being under control of level No. 1, generally indicated at 291 in FIG. 8a. Latching relay 265 has holding contacts 278 which apply B+ continuously from stepping switch level 1 (291) to hold it energized once reset button 261 is pushed. This condition obtains until the stepping switch moves to its reset position, shown as position 1, the B+ is removed from relay 265. The stepping switch driving rotor 293 is energized for each step by the RC time-pulse generator 295 which is energized over lead 299 and contacts 301–303 when closed by relay 265.

Pulse generator 295 discharges periodically to energize rotor 293 to complete the homing operation.

It might be mentioned that a "off-normal" contact could be used in lieu of stepping switch level 1 (291) and relay chains could be used (each with 4 make contacts being closed per stage of the relay chain) in lieu of stepping switch 203.

The latching relay 265, shown in the preferred embodiment of FIG. 8a, has now been described in its functions of assuring that the stepping continues until the home position has been attained and, as has been previously indicated, also resets the seven groups of four storage relays by opening the common ground contacts 271 and 273.

When the first digit of the vertical address is entered into keyboard 25 by depressing of the appropriate digit key, the information is given in binary coded form to the thousands order relays 251 through 254 (FIG. 8b). Depression of any one of the 10 keys on keyboard 25 causes the four output lines 221 through 224 to have the corresponding binary code in the form of the presence or absence of B+. The rotor magnet is actuated over lead 297 from the keyboard for the next entry operation.

Assume for example, that the vertical address 3485 is to be set into the ten key keyboard 25 and that the thousands order digit 3 has just been depressed. Then on output lead 221 a B+ connection or condition will appear which will be applied over wiper 307 (FIG. 8b) of the fifth level 240 of stepping switch 203 by way of its contact No. 1 and lead 309 to memory cell or relay 254. Since this relay is already grounded over its L lead 311 extending back to contacts 271 and 273 at point L (FIG. 8a), the positive condition will energize relay 254 (FIG. 8b). Energization of this relay will cause its latching contacts 313 and 315 to close thereby applying the local B+ supply to hold relay 254 in the energized condition throughout the remainder of the operation until the reset button 261 (FIG. 8a) is again depressed.

Energization of relay 254 also causes its transfer contact blade or armature 317 to close on contact 319 thereby applying B+ over lead 321 and duplication box 323 to lamp 325 of the positive vertical array 175 (FIGS. 8d and 4b). Note here that the duplication box 323 simply indicates that the three right-hand connections are the same as the transfer contacts detailed in the left side of box 323.

This positive lamp is thus lit because of the positive connection to its ground 327 (FIG. 8d). It may also be noted that the lamp 325 is one of four lamps in the thousands order 331 (most significant digit of the vertical address), it being in the lowest binary order of this most significant digit place. It may also be noted that its correspondingly located of similar lamp 333 in the negative lamp array 177 is de-energized because its B+ lead 335 extends over duplicating box 337 (FIG. 8b) to the other transfer contact 339 of memory relay 254.

In similar fashion it will be appreciated that coded output line 222 from the keyboard 25 will be effective over level 4 (239) of the stepping switch by way of its contact 1 to energize memory relay 253 and cause it to establish a holding circuit from its local B+ supply lead 241 (FIG. 8b). Energization of memory cell or relay 253, as previously described in connection with relay 254, causes lamp 243 in the thousands order 331 of the positive array 175 to be lighted and its corresponding lamp 245 to be turned off.

Both output lines 223 and 224 from keyboard 25 do not receive the B+ level from the keyboard and thus their circuits over level 3 (238) and level 2 (237) to relays 252 and 251 do not energize these relays. Consequently, their respective latching contacts remain open and their associated lamps 351 and 353 of the thousands order 331 of the positive array 175 remain off. Of course, the transfer contacts for these relays 252 and 251 maintain the correspondingly located lamps 355 and 257 in the negative array 177 in their normally on condition.

The foregoing explanation establishes the condition illustrated in the positive and negative lamp arrays 175 and 177 of FIG. 4b with respect to their left-hand vertical columns. In other words in the positive lamp array 175 the lighted lamps 179 and 181 correspond to lamps 325 and 243 and the unlit lamps 183 and 185 correspond to lamps 351 and 353. The opposite pattern is true in the negative lamp array 177, as may be observed from a comparison of the aforementioned description of lamps 335, 245 (off) and 355, 357 (on) of FIG. 8d relative to the left-hand column of lamps in FIG. 4b.

In this same manner, the memory relays or cells (not shown) of the hundreds order storage 232 (FIG. 8a) control the lamps (not shown) of the next most significant digit orders 367 and 369 of the positive and negative lamp arrays 175 and 177, respectively. Similarly, the presence or absence of a tens digit and its magnitude, as stored in binary code in storage 233 (FIG. 8a), will control the associated lamps of the tens digit (in binary form) orders 371 and 373 of the positive and negative lamp arrays and, of course, the same is true with respect to the units digit stored in the memory cells of memory storage 234 relative to the lamp arrays 375 and 376 of FIG. 8d.

Thus, the positive and negative light arrays 175 and 177 are set up with the new address for use in the coincident seeking operation in connection with the vertical scroll movement. This circuitry utilizes the first four contacts of stepping switch 203 at level 2 (237 FIG. 8a), and levels 3, 4 and 5 (238, 239 and 240 in FIG. 8b) to handle the vertical scroll address which may comprise a number having from 1 to 4 digit places or orders. Of course, indicator means (not shown) of conventional nature are provided (for the convenience of the operator) to indicate the digits set into the memory storage.

Vertical sub-column and lens selection

When the stepping switch 203 reaches its fifth position, the sub-column and lens selecting digit (fifth digit of the address) will be stored in the fifth digit storage unit 401 (FIG. 8a). This storage unit is identical to the storage relay units 251 through 254 of FIG. 8b previously described. Additionally, the individual storage units of fifth digit storage 401 (FIG. 8a) are wired to the fifth position of the stepping switch levels 2 through 5. It might be pointed out that only two, or at most three of the individual memory relays or cells (such as 251 of FIG. 8a) need be included in the fifth digit storage 401 because only four digits are necessary to this command as previously explained in connection with the right-hand and left-hand sub-columns with the long lens setting and the center sub-column with the long lens and wide-angle lens selection.

Horizontal address

The sixth and seventh digit positions on the keyboard 25 (FIG. 8a) of the address are adapted to be set up in the sixth and seventh digit memory storage 403 and 405 respectively, the sixth digit being indicative of the tens order and the seventh digit the units order of the horizontal address. The circuitry for these two orders is again identical to that described in detail in connection with the first digit thousands order 231 of FIG. 8b and accordingly only the connections from stepping switch 203 levels 2 through 5 (FIGS. 8a and 8b) from positions number 7 thereon to the seventh digit storage 405 are shown, it being understood that the memory cells or relays of sixth digit storage 403 are connected to positions number 6 on the same wiper levels.

Once the direction sensing staggered position (corresponding to FIG. 6) is effected, the scroll present location or address is compared with the new address stored in the horizontal digit storage orders to determine in which direction the scroll should be moved to proceed to the new address.

Also, in FIG. 8d a positive horizontal lamp array 411 and a negative horizontal lamp array 413 are shown which are constructed in the same manner as the previously described arrays 175 and 177. Similarly the electrical connections including the latching and transfer contacts for the binary bit storage relays of horizontal memory units 403 and 405 to the lamps of the positive and negative arrays 411 and 413 are the same as previously described in connection with the vertical address arrangement and accordingly, are not shown. However, it might be mentioned that in the example presented in connection with the scroll 43 of FIG. 3, only 36 horizontal rows are contemplated in the relatively small size scroll and accordingly, the tens order sixth digit storage 403 of FIG. 8a and its associated positive and negative lamp banks in arrays 411 and 413 need only accommodate the digits 0 through 3 and hence, require less memory cells or relays. The other techniques, such as direction sensing, coincident search expediting by disabling the lower order, etc. may be followed in the same manner as is explained in detail with respect to the vertical axis. The clear button 261 (FIG. 8a) and latching relay 265 may be connected in common for the vertical and horizontal circuitry in order that both searches may be initiated simultaneously.

Direction sensing circuitry

The manual insertion of the seven digit number providing for the vertical and horizontal addresses and the lens selection or at least depression of the seventh digit key (be it the number zero or other digit) in keyboard 25 enables the search sequence to start automatically. Obviously, a start button could be used in lieu of this automatic provision.

The eighth position on the sixth bank 415 (FIG. 8a) initiates the direction determination process which, of course, is the first requirement to the search sequence. Wiper 417 of level 6 shown at 415 applies B+ to lead 419 which energizes relay DS2 shown at 205 in FIG. 8b, and also relay DS1 shown at 201 and connected in parallel therewith. Energization of the DS1 relay 201 causes all of the lamps in the negative array 177 of FIG. 8d (also horizontal array 413) to be turned off by pulling all of the armatures corresponding to armature 421 to the left to connect the negative lamps through their contacts corresponding to contact 423 from point R (FIG. 8b) to the corresponding R numbered contact of bank 1 of direction sensing (vertical) switch 425.

It will be recalled that the direction sensing or determining operation takes place after the staggered position of scroll code 117 (FIG. 4a) to lamp arrays 175 and 177 of FIG. 6 is established. This position is attained when the scroll code 117 is moved up (in FIG. 3) a distance of one sub-column (from the center column) at which point direction sensing sync bit 148 (FIG. 6) covers or blanks out its associated lamp 149 so that photocell P1 (shown at 150 in FIG. 4b) sees the dark or black condition (FIG. 8c). Obviously, if the old address were to a lower sub-column, the movement to the direction comparing position would be greater and if the old address were to an upper sub-column, no movement is required or permitted.

From FIG. 8c, it is seen that the photocell circuit 431, identified as P1 Flop, has provision for a dark output signal on lead 437. It should be apparent that the P1 Flop circuit 431 can be simply a multi-vibrator or flip-flop which is caused to assume one condition so long as light is observed and the other condition when darkness is observed. It is, of course, connected to provide an output pulse or level of positive voltage whenever its condition is switched.

The dark output lead 437 from the direction sensing photocell circuit 431 extends over contacts E–F to the vertical up drive actuating control 440 on its stop lead 441 and over contacts U–V to the horizontal left drive control 443 on its stop input lead 445. These controls apply their respective brakes instantly to stop their drives which had been initiated on the slow speeds over common lead 451 including contacts X–Y (FIG. 8c) connected to B+ via contacts 453 and 455 of latching relay 265 (FIG. 8a). Contacts E–F, U–V and X–Y are all closed during the "homing" period for stepping switch 203 as they are operated by latching relay 265.

The eighth position of the sixth level 415 (FIG. 8a) of stepping switch 203 applies B+ from wiper 417 over lead 651 to the motor 457 which drives the wipers 461 and 463 of the direction sensing switch 425. A time delay is provided in the lead to motor 457 by any ordinary RC device 455 to insure that relays DS1 at 201 and DS2 at 205 (FIG. 8b) are energized before the wipers of the direction sensing switch 425 are moved.

The DS1 relay 201 (FIG. 8b) permits the wiper 461 (FIG. 8a) of bank 1 of the direction sensing switch 425 to apply B+ to the lamps, such as 357 (FIG. 8d) of the negative vertical array 177 in sequence. The R1 contact of switch 425 first turns on lamp 357 (FIGS. 4b and 8d) with the wiper 461 then stepping to contact R2 to turn out lamp 357 and turn on lamp 355. This operation is continued until each of the sixteen lamps of the negative vertical array 177 is turned on and off in sequence. Obviously, similar structure is provided for the negative horizontal lamp array which is brought into operation at the same time but is not shown because it is simply less complex and repetitious of the circuitry being described.

Observation of bank 2 of the direction sensing vertical switch 425 will make it apparent that the P connections from the positive lamp array (see box 323, FIG. 8b) are brought to bank 2 in the outer circle of contacts thereof while the Q memory cell connections (FIG. 8b) are also extended to the inner circle of bank 2. The wiper 463 includes an outer short circuited portion for connecting respectively the P and Q contacts in sequential order such that the positive code or new address stored in the memory cells (which would ordinarily light the lamps of the positive vertical array 175 of FIG. 8d) will now light those bit lamps in bit-by-bit sequential fashion. Of course those lamps that would not be lit by their associated memory cells will not be lit in a sequential sampling.

Since relay DS1 shown at 201 in FIG. 8b is energized during the same time interval as the DS2 relay 205, it will simultaneously establish the sequence of the turning on of the lamps of the negative vertical array 177 of FIG. 8d. This action is established regardless of the code stored in the associated memory cells or relays and notwithstanding the positive code overlay indicative of the present scroll position. All 16 lamps in the positive and negative arrays are sequentially lit in corresponding pairs such that the most significant digits are lit in the most significant bit positions, this sequence is followed in each digit order in decreasing order.

It will be recalled that the P3 and P4 photocells (shown at 191 and 193 in FIG. 4b) will observe the respective sequencing of their associated lamps.

The direction sensing position established by the P1 photocell 150 (FIG. 4b) and its associated direction sensing bit 148 (FIG. 4a) is, as previously explained, typified in FIG. 6 wherein the transparent scroll window 141 is over the positive lamp array 175 and the positive scroll code 142 is over the negative lamp array 177.

*Logic*

According to computer techniques the well-known AND, OR, NOT, or INHIBITING circuits may be employed to form the logic for carrying out the principles of my invention. Thus, for certain conditions of inputs established by my circuitry the proper instructions may be applied to the actuating means or other active elements, particularly as is depicted in FIG. 8c. For example, the Drive Logic 435 is adapted to receive inputs as illustrated there in block form and further explained in circuit detail in connection with FIG. 9.

The bit by bit comparison of the new address to the present address is done in the Drive Logic 435, where the condition of photocell P3 Flop 485 and P4 Flop 487 is compared. The logical equations have previously been given and the output connections for carrying out these directions will now be shown.

Since the vertical drive has been shown in detail and is more complex in general than its horizontal counterpart, this logic output will now be discussed, particularly in connection with FIG. 8c. The six output leads $a$ through $f$ from Drive Logic 435 are connected to the vertical down-drive 439, respectively, at points $a$, $b$ and $c$ and to the vertical up-drive 440 at points $d$, $e$ and $f$, respectively. The seventh lead $g$ extends to point $g$ at the fast relay 490 of FIG. 8d.

The Drive Logic 435 output leads $a$, $b$ and $c$ control the vertical actuating means 131 (FIG. 3) or motor 511 (FIG. 7) with respect to the fast driving condition, the slow driving condition, and arrested movement or stop. Similarly, vertical up drive has the same controls applied at points $d$, $e$ and $f$, also to actuate motor 511 (FIG. 7) but in the opposite direction. Reversal of the drive of motor 511 may be effected through the gear reduction and reversing box 509 following well-known practices. I believe this to be the fastest method of controlling the scroll positioning. However, it will be obvious that the motor 511 could itself be reversed in driving direction.

The brakes 505 and 507 are provided to maintain a tension in the scroll 37 at all times. The cartridge 35 including the scroll is adapted to plug into the gears or connections 501 and 503 to permit driving of the scroll, all of which are included in the overall motor drive housing 116 (FIG. 2). This housing is fixed to the rear wall 61 of the console 21 (FIG. 1) but in other embodiments, the small scroll driving motor and gear reduction train, along with the brakes, being relatively inexpensive, can be part of the cartridge 35 and insertable into the console with each such cartridge. All that is required is a long cable having leads for the driving controls which must be plugged into a socket (not shown) of the console 21.

Each brake 505 and 507 slidably engages a collar on the gears (or coupling units) 501 and 503 such that tension is established in the scroll medium 43 at all times. The gear reduction and reversing mechanism 509 includes the usual slippable clutch which permits driving in one direction or the other with the clutch being less yieldable than the tensioning brake gripping action so that it overrides the brake tensioning to drive. Of course the stop signal by applying full power to the brake solenoids overrides all others. Such a stop signal is effective at the brakes 505 and 507 through solenoid mechanisms (not shown) operable simultaneously to effect instant stopping when the motor is in the slow speed condition. In other words, the stop signal overrides the motor driving signals, with the stop signal being instantly effective with respect to slow motor movement and being only slowly effective with respect to the fast motor movement condition to permit the programmed overthrow.

Search expediting

The manner of expediting the location of the general address area will now be described in connection with the seventh Drive Logic 435 output lead g of FIG. 8c. This lead extends to the fast (motor speed) relay 490 of FIG. 8d which controls contacts 491 and 492 located above the vertical positive lamp array 175 and the vertical negative lamp array 177, respectively.

The contacts 491 (FIG. 8b) are provided to interrupt each of the leads (not shown) which extend B+ to the positive vertical array lamps of the units order. These lamps correspond to lamps 353, 251, 243 and 325, shown in detail in the thousands order of this lamp array. When the relay 490 is energized, the light pattern generator is disabled with respect to the unit's positive order and also with respect to the unit's negative order through the four sets of contacts 492 also under control of relay 490. This permits coincidence to be sought in blocks of ten units or to the nearest tens order digit. Exact coincidence is then established to the addressed units order digit by dropping out or de-energizing relay 490 at the time coincidence has been sensed on the fast motor speed and the programmed overthrow has been effected. In other words, when the motor drive receives the slow, reverse signal, Drive Logic lead g drops out the search expediting relay 490.

It has previously been mentioned that exact coincidence is attained when the P2 Flop photocell circuit 483 (FIG. 8c) receives the black condition due to the presence of its coincidence bit 146 (FIG. 4a) at the same time that the photocell of the P3 Flop circuit 485 and the photocell of the P4 Flop circuit 487 read the black condition. Accordingly, the appropriate sides of these flip flops are connected together and extend to an AND circuit in the Drive Logic 435. This AND circuit exercises two controls to the motor actuators. The first reverses and slows down the drive if the motor is in the fast speed when the AND output was developed. The second stops the motor drive instantly if it were in the slow driving condition when the AND signal was developed.

Lastly, the programmed logic for initiating the direction sensing may be appreciated by noting that the P1 Flop or direction sensing photocell circuit 431 has its dark output lead 437 extended to the stop input for the vertical up-drive 440 and the stop input for the horizontal left drive 445. It is noted that the contacts E and F and also U and V of latching relay 265 (FIG. 8a) are normally open and close upon energization of the latching relay when the normally open clear button 261 is depressed. Consequently, the presence of the first direction sensing bit 148 (FIG. 4a) will stop these drives by overriding the slow direction sensing movement through a stronger solenoid or the like or a positive acting device.

It will be recalled that this slow drift or direction sensing movement had been pre-programmed to take place in the vertical up and horizontal left direction at the slow speed over lead 451 and contacts X–Y, which was energized at the clearing time by latching relay 265.

Sequence of operations of drive logic

The relay-logic embodiment of FIG. 9 will now be described in connection with the logic functions as above set forth. In sequence direction sensing must first be performed before the other operations can follow. It is initiated following the insertion of the seventh digit into the keyboard 25, by the wiper 417 of the sixth level 415 of stepping switch 203 moving to position 8 (FIG. 8a). The direction sensing relay 604 (FIG. 9) is energized or activated over lead 651 (FIGS. 8a and 8c) before the motor 457, which drives both banks of the direction sensing switch 425, is started due to the time delay device 455. The B+ connection from wiper 417 is established over lead 651 (FIG. 8a) which lead is energized when wiper 417 is on position 8.

The P1 direction sensing Flop circuit 431 (FIG. 8c), however, already had its photocell 150 (FIG. 4b) sensing the first sync bit 148 which appeared, in accordance with the pre-programmed slow horizontal left and vertical up motion initiated long before when the clear button 261 was depressed. Its dark output lead 437 is connected through contacts E–F to the vertical up drive 440 over lead 441 and through contacts U–V to the horizontal left drive 443 over lead 445. It is to be noted that both of these connections extend to the Stop control for drives 443 and 440 such that the appearance of the dark or black condition at P1 when contacts E–F and U–V are closed causes all motions to be arrested. This normally happens with scroll movement of one sub-column, two sub-columns or no movement at all depending upon the address last located.

Once the direction sensing position is achieved, with the transparent window 141 of the scroll 117 (FIG. 5) overlying the positive lamp bank 175 and the positive scroll code window 142 overlying the negative lamp bank 177, the comparison of the scroll address and the newly indexed number can begin. For this purpose relay 609 (FIG. 9) is employed to follow the output of the P4 Flop circuit 487 (FIG. 8c) over leads 656 and 657 (FIG. 9), the latter lead including a set of normally open (indicated by an x) contacts 604a. Since the direction sensing relay 604 is energized during the direction sensing process, the contacts 604a will be closed and thus relay 609 may sense the condition manifested by any one of the 16 lamps of the negative lamp array 177 as they are sequentially lighted under the positive address pattern. The P4 photocell is so connected that when it senses the black or no light condition for any given lamp, it will provide a positive voltage level to energize relay 609 which has its other side grounded. At the same time relay 612 is arranged to receive the output of the P3 Flop circuit 485 over lead 481, which is the positive lamp array code, as sequentially read through the transparent window 141.

Thus, each time the direction sensing switch 425 is caused to step by motor 457, a comparison is made thereafter of corresponding bit lamps of the new address relative to the address of the scroll's present position. This is accomplished by an AND circuit essentially for the condition of relays 612 and 609.

One effect of this AND operation is apparent at relay 621 which controls the fast down movement. As can be seen in FIG. 9, the outer branch or energizing path 653 for relay 621 includes normally closed (shown by a single cross mark) contacts 609a, normally closed contacts 612a, and normally open contacts 606a connected in series. The contacts 606a are closed at the present time because the relay 606 (FIG. 9) is energized over normally open contacts 602a and normally closed contacts 603a, and normally closed contacts 601g, relay 602 having been energized over lead 451 when the latching relay 265 was activated (FIG. 8a) upon depression of the clear button 261. Coincidence relay 601 (for normally closed contacts 601g) is not activated until the coincident condition is attained, and relay 603 (for normally closed contacts 603a) isn't energized (by way of lead 652) until direction sensing is over; hence relay 606 is in condition to disable the least significant digit apparatus. This is accomplished from the common B+ supply 658 (lower left of FIG. 9) by way of now closed contacts 606g which extend B+ (from g to g) to disabling relay 490 of FIG. 8d, as previously explained.

Considering now the direction decision making apparatus, it will be recalled that the equations used were given as follows:

$X-O$ = no action
$O-X$ = no action
$X-X$ = move up (FIG. 2) or move right (FIG. 3)
$O-O$ = move down (FIG. 2) or move left (FIG. 3)

Thus if relays 609 and 612 are both de-energized during the reading of a particular bit position as the direction sensing switch 425 (FIG. 8a) steps from point to point, the relay 621 will be activated to establish high-speed operation in the downward direction. This is seen from the equations because it duplicates the non-black condition to the non-black condition ($O-O$). In other words, relays 609 and 612 are both relaxed at the same time so relay 621 is operative over their normally closed contacts 609a and 612a.

Similarly, relay 622 is adapted to initiate high speed-up movement by virtue of its outer path 659, including the normally open relay contacts 609b, 612b and 606b. Closure of the normally open contacts 606b has already been explained. The other series connected contacts 612b and 609b will be closed whenever both relays 609 and 612 receive a positive level due to the black to black condition. In other words, in the equation $X-X$ the upward movement at the fast speed is established.

The direction sensing switch 425 is made extremely fast by its motor 457 in order that it may complete its rotation before the scroll gets up to speed and actually locates the coincident position. Thus, relay 614 is activated over lead 650 which receives B+ via wiper 417 (FIG. 8a) when the stepping switch level 6 (415) reaches the 9th position. At the same time it should be noted that the direction sensing relay 604 is deactivated because B+ has been removed from lead 651 at position 8 of stepping switch level 415.

Coincidence relay 601 will be activated when P3 and P4 have detected darkness at the time P2 detects a sync bit. This is, of course, true because the three normally open sets of contacts 607a, 612c and 613a are located in series in the energizing path for relay 601. The contacts 612c will, of course, be closed when the P3 photocell observes the dark or black condition to energize relay 612. Similarly, contacts 613a will be closed when the P4 Flop sees the black condition and the relay 613 will be energized over the now closed contacts 614a. The contacts 607a are closed when P2 experiences the black condition and the positive level is applied to lead 661 to energize relay 607.

Some transfer logic built into these interconnected relays will now be explained. Each of the driving speed control relays 617, 621, 622 and 623 has a holding circuit which includes a normally open contact of relay 601, labelled as 601a through 601d, and its own set of normally closed contacts. If relay 621 starts a fast downward motion, it continues until the coincident condition is presented, at which time relay 623 is activated and establishes its own holding circuit because relay 621 closes relay 624 at 621a. The path for energizing relay 623 is over contacts 624a, 621c, 601e and 622a. Normally open contacts 624a are now closed and normally closed contacts 622a and 601e remain in the closed condition with control being in relay 621 with its now open set of contacts 621c. Thus there will be slow-up movement until coincidence is again reached.

The presence of the coincident condition causes deactivation of relay 621 because its holding circuit is then interrupted at normally closed contacts 601b due to the activation of relay 601 by the presence of the dark condition presented to photocells P2, P3 and P4 simultaneously. Once the coincident condition is observed, relay 621 contacts 621c return to the normally closed condition, thereby energizing the slow-up relay 623. This relay, of course, reverses the drive to eliminate the overthrow. Exact coincidence then energizes relay 601 to open contacts 601e and deactivate the slow-up relay 623 and arrest all motion.

At the lower left of FIG. 9 the connections for the vertical drives 439 and 440 are shown. Leads a through g of FIG. 9 extend B+ from terminal 658 to leads a through f of FIG. 9 and g of FIG. 8d. For example, contacts 621' (FIG. 9) energize vertical down drive 439 (FIG. 8c) on its fast lead (a) to drive motor 511 (FIG. 7) in the down direction at full speed. Contacts 617' drive motor 511 at its slow speed via slow down lead (b) of vertical down drive 439.

In a similar manner the fast-up relay 622 (FIG. 9) and the slow-down relay 617 cooperate. The companion relay to the fast-up relay 622 is relay 625, which is energized when the relay 622 closes the normally open contacts 622d. It is relay 625 which readies the slow-down relay 617 to take over by closing its contacts 625a in energizing path 673 including normally closed contacts 621b, 601f and 622b. Thus when fast-up relay 622 is dropped out, all contacts will be closed in path 673 to operate slow-down relay 617 and compensate for the overthrow in the upper direction. Moreover, when coincidence is again observed, the normally closed relay contacts 601f will open to drop out relay 617 thereby arresting all motion.

When it is desirable to inactivate the least significant digit to expedite the search operation, relays 606 and 603 are employed to control the search expediting relay 490 of FIG. 8d. When the clear button 261 (FIG. 8a) was depressed, the lead 451 received B+ to energize relay 602. Energization of relay 602 caused relay 606 to be activated over the now closed contacts 602a and to latch itself through its own holding contacts 606 and the normally closed contacts 603a and 601g. These latter contacts will be opened when the direction sensing switch level 425 (FIG. 8a) causes its wiper 461 to move the 13th position, applying B+ to lead 652, which supplies relay 603. Thus it may be seen that relay 606 is energized from the time the clear button 261 is pushed until the direction sensing switch 425 has moved through 12 steps of the bit comparison process. Therefore, when the digits of the three most significant places have been compared, and the wiper 461 of switch 425 has moved to the 13th position, relay 606 is de-energized because relay 603 opens its contacts 603a. This is true unless prior to this time the fast down relay 621 or the fast up relay 622 becomes energized to take over control.

The search expediting relay 490 (FIG. 8d) is controlled over relay 606 contacts 606g (lower left FIG. 9) such that the least significant search apparatus will be deactivated when relay 606 is energized. Once energized, it will not be de-energized until relay 601 is activated by the initial coincident condition to open its normally closed contacts 601g and permit the least significant digit to determine final coincidence.

When, during the comparison process relays 609 and 612 simultaneously receive the dark condition or the light condition after the three most significant bit or digit places have been compared, then expediting relay 490 will not be energized. In other words, if direction sensing switch 425 has gone to the 13th position (see FIG. 8a), before a direction determination is made, it is apparent that the new location to be reached will be very close and inactivation of the least significant digit apparatus would probably cause inadvertent searching. In this event fast movement in either the up or down direction is to be avoided. Accordingly, relay 606 is no longer energized and therefore the slow-down relay 617 or the slow-up relay 623 will take over. In order that either relay 617 or 623 (for slow drive) may be energized, it is necessary that the least significant control relay 606 must be inactive.

The foregoing description has served to permit location of images in the center sub-column. It will now be explained how an image is retrieved, if situated in a sub-column just above or just below the center sub-column. Relay 626 will be closed or activated at the end of coincidence seeking because all relays in its chain will be inactive thereby closing a path including contacts 617a, 623a, 621d, 622c, and 606c to permit its energization. In series with relay 626 there is connected a condenser 675 which slows down the initiation or release of this relay.

However, when relay 626 is energized it closes its contacts 626a to energize relay 627 which will hold until the clear button is pushed.

Looking now at FIG. 8a it will be noted that there are four leads numbered 560 through 562 from the fifth digit or lens memory 401. Relay 608 is provided to control the lower sub-column operation and relay 619 the upper sub-column operation. The upper and lower sub-columns are reached by depressing keys which energize leads 560 or 561. Thus if either of these sub-columns is to be reached in the present example, then its corresponding relay 619 or 608 will accordingly be energized. If such is the case, either slow-up relay 623 or slow-down relay 617 will again be energized to permit the desired movement. This may be appreciated by observing the extreme right-hand energizing paths for these two relays including respectively contacts 619a, 626a, and 626b, 608a. The slow-down relay 617 permits movement down in response to energization of relay 608 and the slow-up relay 623 permits slight movement up in response to energization of relay 619. The condenser 675 in series with relay 626 will not permit relay 626 to be deactivated until the scroll has moved enough so that the center coincidence bit no longer causes relay 601 to be made and permits either relay 617 or relay 623 to hold themselves through the normally closed contacts 601a and 601d of relay 601. Since relay 627 is closed when either relay 617 or 623 is activated, relay 628 will be energized and will hold itself in such state. P2 is the flop that is also used for sub-column positioning. As the scroll moves up or down, it will cause the bit associated with either the upper and lower sub-columns to register darkness on P2 and activate relay 607 connected thereto over lead 661. When relay 607 is energized following the closure of relay 628 (by 627 at contacts 627a or 627b with 617b or 623b) it will cause relay 629 to hold itself closed and the closing of relay 629 will stop the scroll motion by opening either the circuit over drive relay 617 or drive relay 623 at contacts 629a or 629b. The other two leads 562 and 563 from the lens control bank 401 of FIG. 8a go to the motor drive for the projector output. Lead 562 is provided to energize the clockwise lens motor 676 (FIG. 10) and lead 563 is provided to energize the counterclockwise lens motor 677. Thus whichever of these leads is energized by depression of a key in the fifth digit order will determine whether or not a single image or an entire frame will be outputted. Obviously lens motors 676 and 677 may comprise a single drive.

In FIG. 8a lead 563 will be active whenever the lens 81 of FIG. 2 is to be positioned for entire frame viewing. The lens turret drive (not visible in FIG. 2) is provided for turning the lens turret 73 clockwise until the microswitch 801 (FIG. 10) causes the motor 676 to stop, with the lens turret in proper position. Lead 562 activates drive 676 (FIG. 10), and it operates as above except that it turns turret 73 counterclockwise to position lens 83 for sub-frame viewing. The lens movement, which is a function of the fifth memory relay group 401 (FIG. 8a), establishes the lens turret control at the time that stepping switch level 6 (see FIG. 8a at 415) is on the ninth position. As can be seen in FIG. 10, the leads 562 and 563 include normally open contacts 614x and 614y of relay 614 (FIG. 9). The relay 614 is energized over lead 650 but only during the time switching switch level 417 is on the ninth position. Thus it may be appreciated that the use of relay 614 in this manner establishes a proper time interval for the lens revolving function.

The overall system driving arrangement of FIG. 7, which may be of conventional design, is operated by connections (not shown) from the vertical down drive 439 and vertical up drive 440. The connections simply establish slow or fast drive for motor 511 in the forward and the reverse directions. This can be by relay or solenoid or by direct selecting of the entire B+ value from terminal 658 of FIG. 9 or a portion thereof to establish a direct full speed or a direct slow speed drive. The stop control may also be solenoid or relay-actuated and in this case a quick discharge storage condenser type brake application circuit can be employed instantly to actuate either brake 505 or 507 and arrest all motion. The brake tension is established by "trickle" current to the brake operating solenoids or relay circuits and, of course, the clutch of gear box 509 is capable of overpowering either brake in the "trickle" condition. Reverse drive is accomplished best in the gear box 509 by electromechanical apparatus of well-known type.

As to dimensions, a specific embodiment of my invention may include a scroll 37 (FIG. 3) for example, having a width of approximately seventeen inches and a length of the order of two hundred feet. The windows 141, 142 and 143 (FIG. 4a) of the scroll code track 117 may have dimensions of approximately ½" by ½" each such that the overall width of a column including the coding provisions for the transparent window 141 and positive and negative windows 142 and 143 would be about 1.833".

This would include three sub-columns with each sub-column accommodating two information storage unit locations. For example, if a single storage unit is to accommodate a microimage of one average 8½ x 11" page or sheet, then the column width could accommodate six pages and if it is assumed that the 17" scroll width dimension accommodates 12 rows, each with provision for three information units, a frame may be defined as 1 row by 1 column or storage for 18 average pages and, hence, it may be appreciated that a capacity of approximately 253,000 average sheets is provided by this small cartridge. The apparatus described provides an average access time of ten seconds or less per image.

Each cartridge is preferably provided with a blank or uncoded lead-in and tail portion of approximately 15' in length each, which holds the scroll to its spools and also serves to stop the mechanism before the scroll is damaged in the event of a malfunction or misuse of the machine. Each lead-in portion is nicked and a pair of microswitches located in the cartridges (or when desired, they may form a part of the console) lock up the motor drive when either one senses or is actuated by the presence of their associated nick. This master "Off" control is afforded over a single connection to the common power connection (not shown) for the console 21. An all black code on these portions will provide a safety stop if the electrical sensing and circuitry is in proper order.

While my invention has been illustrated and described with respect to a preferred embodiment thereof, I wish it to be understood that I have illustrated the most complex and the speediest device fabricatable in accordance with my teachings; namely, one in which vertical and horizontal scanning may be effected simultaneously. In many instances, it is not necessary that the slewing type motion be generated and, in fact, it is sometimes desirable to achieve the image retrieval by sequential movement first along the vertical axis and followed by a horizontal movement, or vice versa. This, of course, is well within the ability of my device and the apparatus illustrated, through the provision of a simple delay effective at either the horizontal or vertical controls and relievable upon completion of the locating process along the other axis will suffice. It is, moreover, possible with my device to have a single driving arrangement which will sequentially drive the horizontal and vertical scroll movement, thereby permitting a somewhat cheaper and less complicated device at the expense of slower retrieval, which is desirable in certain applications.

An even smaller version of my invention, at least with respect to the retrieval of information at certain locations, involves the elimination of the direction sensing apparatus for one or both axes such that a-return-to-zero is first necessary in order that a piece of information can be located. At this point, it might be mentioned that where one dimension of the scroll is only a small fraction of the other dimension, the elimination of direction sensing means from the short axis scanning or moving device can be very practical without imposing any additional access time limitation. Consequently, in certain applications it is very practical to utilize the simple expedient of addressing from zero to any point along an axis and permitting the drive to be controlled only up to that point, with the facility to return to zero following each retrieval.

Having now described my invention with respect to certain embodiments thereof and in combination with selected features thereof, it is my desire to be limited only by the principles taught herein as indicated by the scope of the attached claims wherein

I claim:

1. Apparatus for locating information stored in a coordinate index system comprising in combination means for registering an index indicative of a particular lrocation of information in the system, an area storage medium having coordinate indexing, output means for outputting information located, means for establishing relative movement between said medium and said output means with respect to any location on said medium and relative to any direction from such location including motion parallel with and also angular to the coordinants of the system, means for sensing coincidence between the addressed coordinate location and the indexing indicia of the medium, means for arresting said movement in the coincident relation and means for initiating the outputting of the located information during arrested movement.

2. An apparatus for retrieving stored information comprising in combination a sequentially code indexed scroll-type storage medium, input indexing means for receiving an index address indicative of a particular location on said medium, means for forming a conjugate code of the address relative to the sequential code, reading means for sensing the medium index and the address for conjugate match, output means, means for establishing relative movement between the storage medium and the output means until coincidence of the index address and the storage medium index is sensed by the reading means, means for arresting movement to maintain coincidence, and means for initiating output of the information at said particular location.

3. Apparatus for locating stored information comprising in combination a coordinate indexed storage medium, said indexing being sequential both longitudinally of and transversely of the medium, means for registering a coordinate location indicia indicative of a particular location on said medium, reading means, output means, means for establishing relative movement between said medium and said output means with respect to any location on said medium and relative to any direction from such location, means for comparing the indicia and the medium indexing at the reading means to direct said movement, means for establishing the movement at high speed to initiate the indicia comparing, means for disabling the reading means with respect to the least significant indicia of the address during the high speed movement, means for reversing the movement direction after the registered indicia has been read at least along one coordinate index, means for restoring the reading means to sense all indicia upon reversal of movement, means for slowing the movement spread upon reversal, and means for arresting said relative movement when the addressed coordinate location coincides with the indexing indicia of the memory medium to permit outputting of the located information by the output means.

4. An apparatus for locating stored information comprising in combination a coordinate memory storage flexible scroll medium, means for registering an input indicia indicatve of a partcular location on the storage medium, output means, means for sensing the medium position relative to the registered input indicia, means for establishing relative movement between the medium and the sensing means, from any coordinate point location to any coordinate point location, said last mentioned means including means for winding the scroll longitudinally and means for moving the output means transversely of the scroll medium, means for arresting said relative movement when the information defined by the index indicia has been located and means for causing the output means to output said located information during arrested movement.

5. An apparatus for retrieving stored information, comprising in combination an area storage scroll medium; an indexing code in the form of discrete unique patterns disposed along at least the longest dimension of the scroll medium, means for receiving an input index indicative of a particular location on said medium; means for converting the index to conform to the conjugate of one of said patterns, means for traversing said medium in any direction from any location thereon to directly proceed to said particular location, comparing means for comparing said code and said one pattern for guiding the traversing means at least relative to said dimension, means for arresting the motion relative to said dimension when a conjugate match occurs at the comparing means, and means for outputting the information so located.

6. Apparatus for retrieving stored information comprising in combination a scroll-type sequentially indexed storage medium, a sensing station for sensing the scroll index, registering means for holding an address indicative of a particular location on said medium, means for comparing characteristics of the scroll index at the sensing station and the address, means for sensing whether the address is greater than the index, output means, means for establishing relative movement between the storage medium and the output means along the shortest path in a predetermined direction in accordance with the sensing means until coincidence of the index address and the storage medium index is reached, means for arresting said movement with coincidence maintained, and means for initiating outputting of information by the output means.

7. Apparatus for locating information stored in a coordinate index system comprising in combination means for converting a portion of an index, the total of which is indicative of a particular location in the system, to a coded configuration, a storage medium having indexing coded configurations for each location thereof along one coordinate, reference means, means for comparing the portion of the index coded configuration with the medium coded configuration relative to the reference means to develop a directional indication, output means, means for establishing relative movement between said medium and said output means in accordance with the directional indication relative to said one coordinate, means for sensing coincidence relative to the reference means between the addressed coordinate, location configuration and the indexing indicia configuration of the memory medium, means for arresting said movement in the coincident relation, means for moving the output means relative to the medium in the direction of coordinates orthogonal to said one coordinate a predetermined amount in accordance with the index other than said portion, means for arresting the output means at said particular location, and means for causing the output means to output the information at said location.

8. Apparatus for retrieving stored information comprising in combination an indexed storage scroll having a transverse and a longitudinal code track, a sensing station for each track, transverse and longitudinal input index registering means for generating a coded configuration of an address indicative of a particular location on said scroll having a transverse index coding and a longitudinal index coding, means for comparing the coding configuration of the scroll tracks at the sensing stations and the generated code configurations to provide direction signals, output means, means for establishing relative movement between the storage medium and the output means in accordance with the direction signals to effect movement along the shortest path made up of any transverse and any longitudinal components to the address, and comparing means for each track for arresting movement having a component in such direction when the code configuration of its associated track corresponds to the generated code configuration for such track.

9. The apparatus of claim 8 wherein the code tracks have sequential indicia and including means for effectively partially disabling a portion of the generated coded address configuration corresponding to the least significant order.

10. Apparatus for locating an addressed area of a storage device comprising, in combination, address register means for receiving an address of information to be located in the storage device, memory means having an information storage code, search means for scanning the code of said memory means, driving means for the search means, means for comparing the address in the register means and the scanned code, means for controlling the speed of the driving means in accordance with the difference magnitude between the address and the code at the scanning means, means under control of said comparing means to arrest the scanning substantially when the memory code read by the search means has coincided with said addressed area allowing for inertial overshoot, means for revising the scanning direction to reach the addressed area at a slower speed, means for arresting all motion at the address, and means for outputting the located information.

11. Apparatus for locating an addressed area of a storage device in accordance with an input address comprising, in combination, memory means having a code, search means for scanning the code of said memory means, means for recognizing the addressed area, code sensing means, logical AND means responsive to the code sensing means and said address, means under control of said last mentioned means to arrest the scanning when the code read by the search means and the address satisfy the logical AND means, and means for outputting the contents of the storage device at the addressed area.

References Cited by the Examiner
UNITED STATES PATENTS

| | | | |
|---|---|---|---|
| 2,782,398 | 2/57 | West et al. | 340—172.5 |
| 2,907,011 | 9/59 | Kuder | 340—172.5 |
| 2,909,717 | 10/59 | Hulls et al. | |
| 2,923,921 | 2/60 | Shapin | 340—174 |
| 3,075,178 | 1/63 | James | 340—172.5 |

MALCOLM A. MORRISON, *Primary Examiner.*